(12) United States Patent
Seo et al.

(10) Patent No.: US 11,587,451 B2
(45) Date of Patent: Feb. 21, 2023

(54) VR EDUCATION SYSTEM

(71) Applicant: Joung-Ho Seo, Jinju-si (KR)

(72) Inventors: Joung-Ho Seo, Jinju-si (KR);
Seong-Jun Kim, Jinju-si (KR);
Byung-Chan Moon, Jinju-si (KR);
Gyung-Yul Choi, Jinju-si (KR);
Eon-Seok Lee, Jinju-si (KR);
Dae-Hong Kim, Jinju-si (KR)

(73) Assignee: Joung-Ho Seo, Jinju-si (KR)

( * ) Notice: Subject to any disclaimer, the term of this patent is extended or adjusted under 35 U.S.C. 154(b) by 8 days.

(21) Appl. No.: 17/105,504

(22) Filed: Nov. 26, 2020

(65) Prior Publication Data

US 2021/0335142 A1 Oct. 28, 2021

(30) Foreign Application Priority Data

Apr. 28, 2020 (KR) .......................... 10-2020-0051398

(51) Int. Cl.
*G09B 5/14* (2006.01)
*G09B 5/06* (2006.01)
*G06T 19/00* (2011.01)
*G10L 15/26* (2006.01)

(52) U.S. Cl.
CPC ............ *G09B 5/067* (2013.01); *G06T 19/006* (2013.01); *G09B 5/14* (2013.01); *G10L 15/26* (2013.01)

(58) Field of Classification Search
CPC ..................................................... G09B 5/067
See application file for complete search history.

(56) References Cited

U.S. PATENT DOCUMENTS

| 2009/0237492 A1* | 9/2009 | Kikinis | ................ | H04N 13/296 |
| | | | | 348/46 |
| 2019/0129591 A1* | 5/2019 | Anders | ................ | G06F 3/0484 |

FOREIGN PATENT DOCUMENTS

| KR | 10-2051568 B1 | 12/2019 |
| KR | 10-2020-0025959 A | 3/2020 |

* cited by examiner

*Primary Examiner* — Kesha Frisby
(74) *Attorney, Agent, or Firm* — Revolution IP, PLLC

(57) ABSTRACT

A VR education system includes a teaching plan storage unit that stores the teaching plan for each lecture including lecture information and at least one keyword and key image, an instructor evaluation unit that converts the instructor's voice data, input through the voice module of the instructor's terminal, into text data by speech-to-text processing and compares the converted data with the teaching plan data stored in the teaching plan storage unit, an instructor recommendation unit that generates an instructor list in the order of matching rate, from highest to lowest, based on the matching rates calculated by the instructor evaluation unit, a lecture providing unit that provides the lecture of an instructor, selected from the instructor list from a trainee terminal, to the trainee terminal, and a lecture monitoring unit that monitors lectures in progress to detect any event that may occur during the lecture.

4 Claims, 5 Drawing Sheets

【Figure 1】
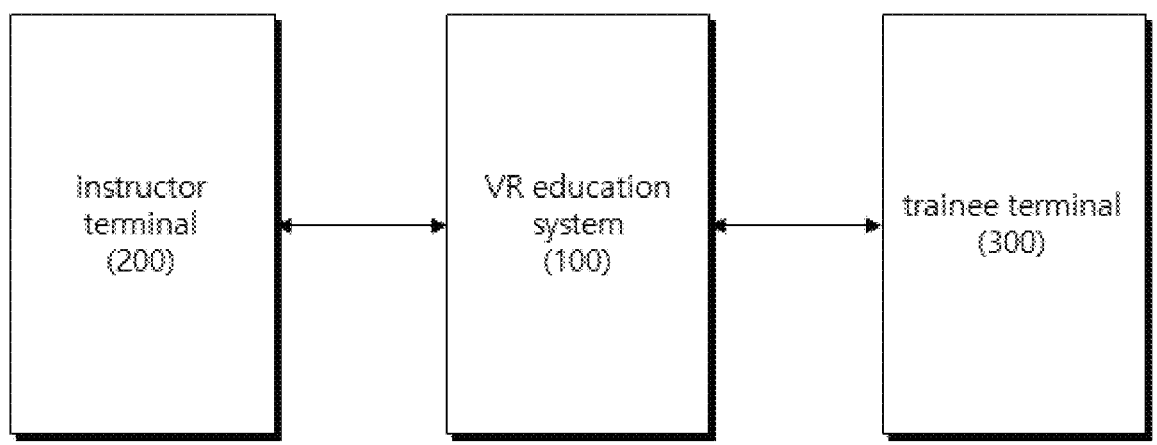

[Figure 2]
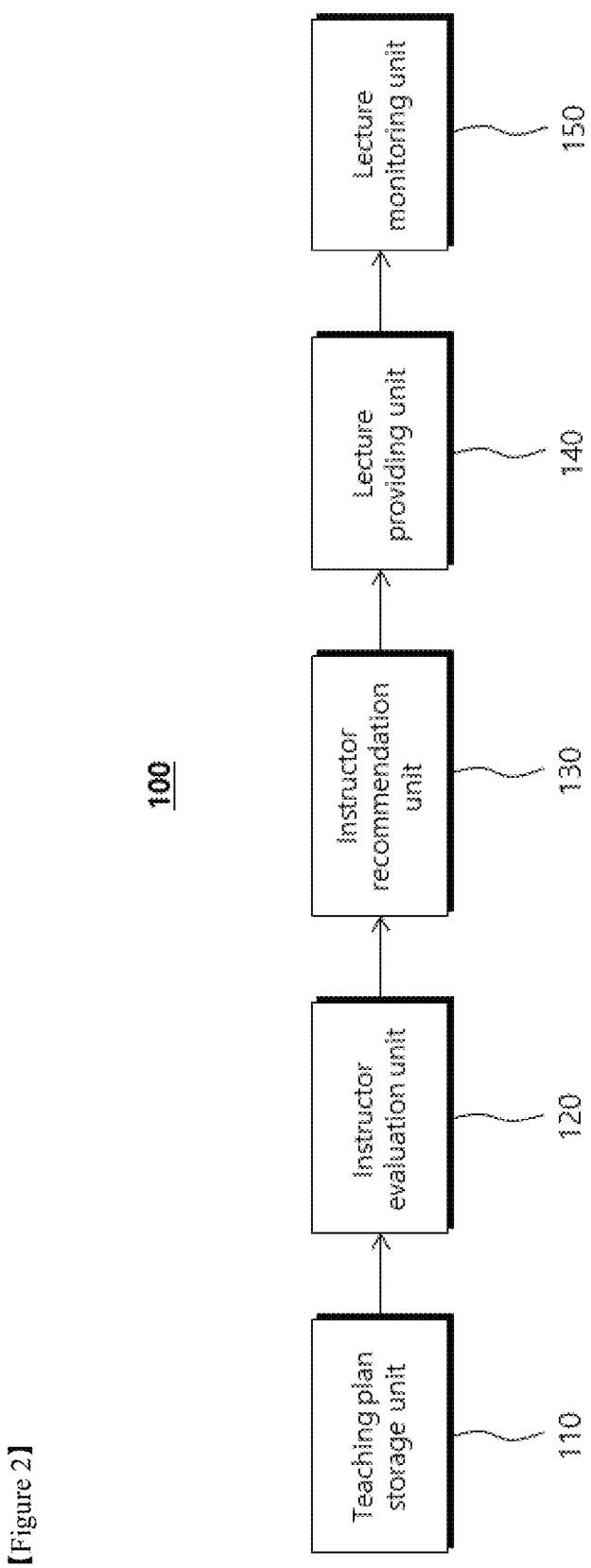

[Figure 3]
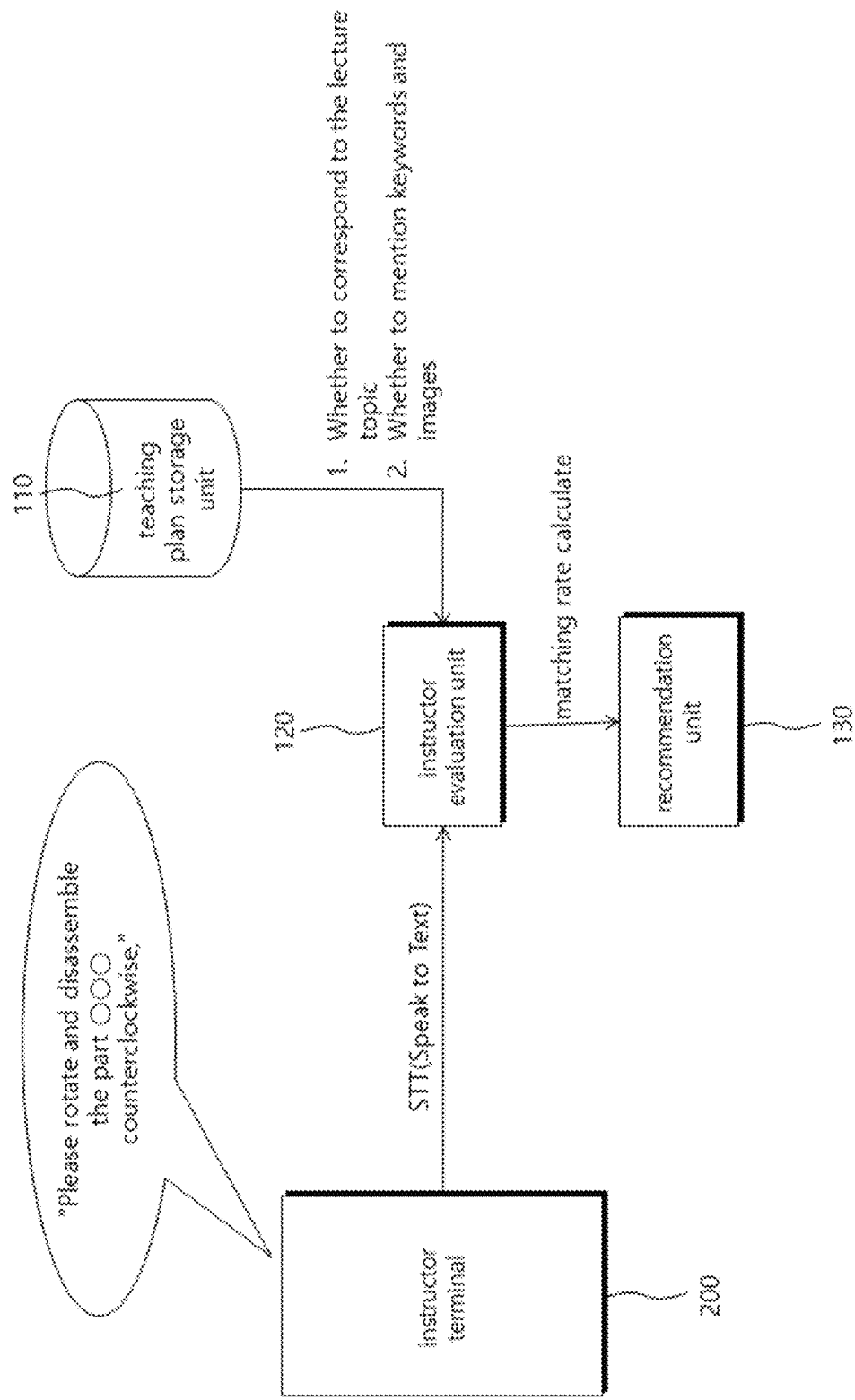

[Figure 4]
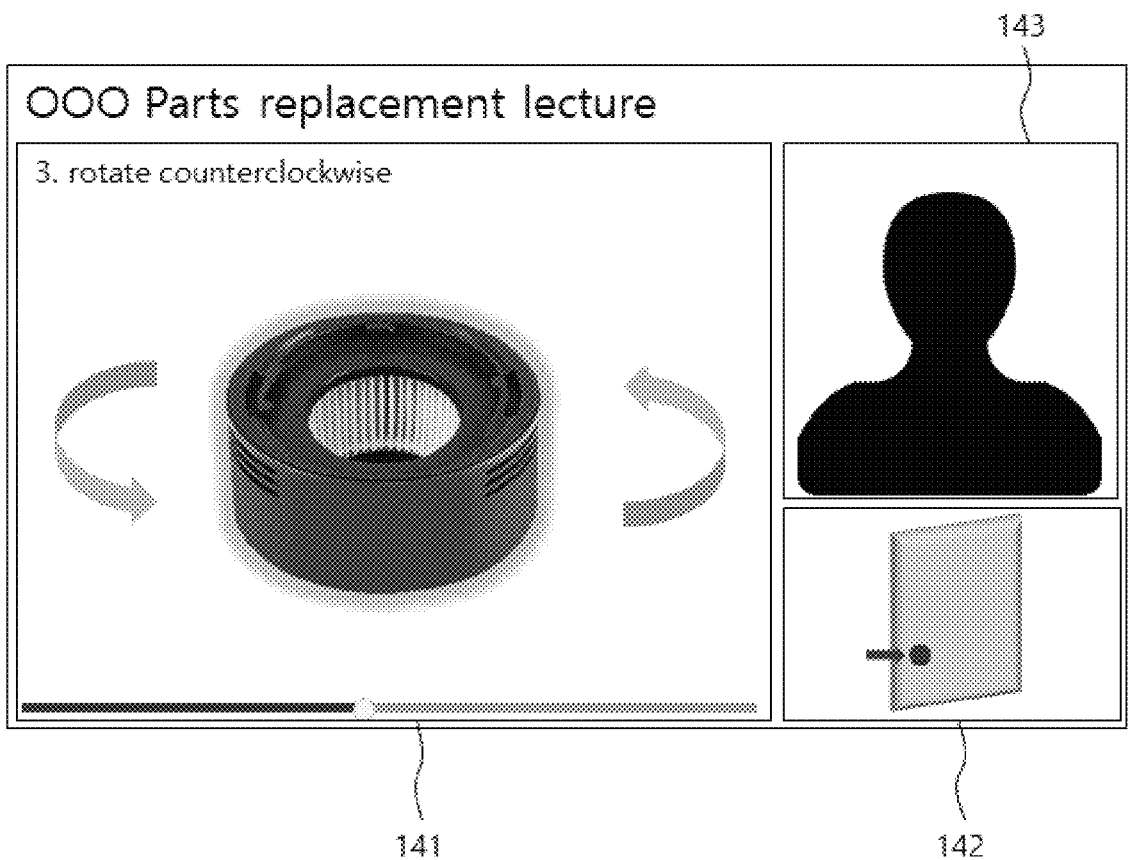

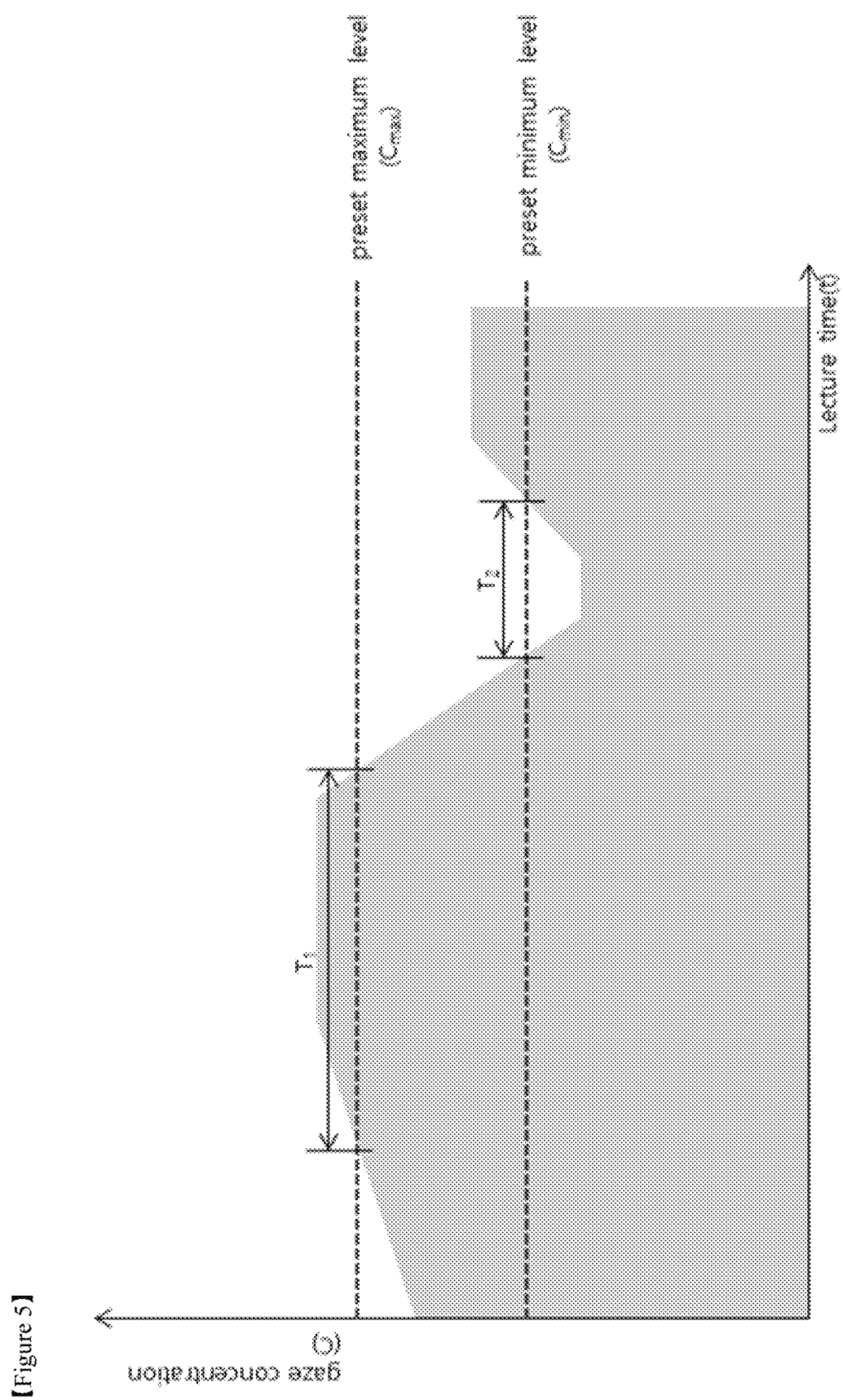
[Figure 5]

VR EDUCATION SYSTEM

TECHNICAL FIELD

The present invention relates to an education system using virtual reality, and more specifically, in a 1:n education, to a VR education system that allows a plurality of trainees to more effectively immerse themselves in a lecture by analyzing the gaze of trainees.

BACKGROUND ART

With the recent development of VR (Virtual Reality) technology, cases of incorporating VR technology in industrial settings are on the rise. For example, VR technology is increasingly being used in industrial sites for the purpose of providing safety experience training or facility operation experience.

Looking at the prior art in this field, Korean Patent Registration No. 10-2051568 discloses a VR training system and method that provides job training by reflecting various situations and characteristics of industrial sites, and Korean Patent Publication No. 10-2020-0025959 discloses an industrial site simulation system that allows managers and trainees to more realistically grasp the operating state of equipment by introducing virtual reality to a simulator that monitors and controls the equipment at industrial sites and displays the operation status of each equipment on the screen.

However, in the industrial field, the conventional VR technology has been being used only by users to simply experience the VR content of a single predetermined scenario, so it has limitations in reflecting various situations and characteristics, as well as in collectively managing a large number of trainees and inducing their active participation.

Thus, there is a need for a study on a VR education system that induces active participation of trainees and provides a realistic virtual education environment.

DETAILED DESCRIPTION OF THE INVENTION

Technical Challenge

The present invention is to provide a VR education system that allows trainees to actively concentrate on lectures by analyzing the gaze of trainees to define a section of gaze concentration and providing content to call attention in a section with low gaze concentration.

In addition, it aims to provide a VR education system that promotes high-quality lectures faithful to the pre-set teaching by comparing the preset teaching plan data with the instructor's actual lecture to calculate the matching rate and evaluating instructors based on the calculated matching rate.

It also aims to provide a VR education system in which education can be quickly performed without waste or damage to new parts by teaching how to assemble, disassemble, and replace parts using virtual reality.

The problems to be solved by the present invention are not limited to the above-mentioned problems, and other problems to be solved by the present invention, not mentioned herein, will be clearly understood by those of ordinary skill in the technical field to which the present invention belongs from the following description.

Solution to Problem

The VR education system according to an embodiment of the present invention includes a teaching plan storage unit that stores the teaching plan for each lecture including lecture information and at least one keyword and key image, an instructor evaluation unit that converts the instructor's voice data, input through the voice module of the instructor's terminal, into text data by speech-to-text processing and compares the converted data with the teaching plan data stored in the teaching plan storage unit to calculate the matching rate, an instructor recommendation unit that generates an instructor list in the order of matching rate, from highest to lowest, based on the matching rates calculated by the instructor evaluation unit, and provides it to the trainee terminals, a lecture providing unit that provides the lecture of an instructor, selected from the instructor list from a trainee terminal, to the trainee terminal, and a lecture monitoring unit that monitors lectures in progress to detect any event that may occur during the lecture and sends a notification message to at least one of the instructor's terminal and the trainee's terminal.

Further, the instructor evaluation unit is characterized in that it converts the voice data input from the instructor's terminal into text data to calculate the matching rate by checking whether the key words and key images included in the teaching plan data are mentioned in the converted text data, where the matching rate is determined in proportion to the scores that are differentially assigned based on a preset error range between the exposure time to be calculated from the beginning of the lecture and the reference time by comparing the exposure time in which the key words and key images are mentioned in the audio data with the reference time assigned to the key words and key images in the teaching plan data, respectively, and determining whether the key words and key images are mentioned in an order set in the teaching plan data to compare the exposure time and the reference time on condition that the key words and key images are mentioned in the preset order.

In addition, the lecture providing unit is characterized in that it explains at least one method of assembling, disassembling, and replacing an object, which is the subject of the lecture, while providing a mini-map displaying the location of the object to the trainee terminal, and playing at least one animation of assembling, disassembling, and replacing the object in case the trainee reaches the position indicated on the mini-map.

In addition, the lecture monitoring unit is characterized in that it collects image information to be input through the camera module in the trainee terminal to analyze the gaze of the trainees, and when the gaze of a trainee is out of a preset frame, pauses any lectures provided on the trainee terminal, sends alert sound and text requesting concentration on the lecture, and sends the information of the trainee who received the alert sound and text to the lecturer, and statistically processes the section where the concentration degree is higher than the preset maximum level and provides it to the instructor terminal, and statistically processes the section where the concentration degree is less than the preset minimum level and automatically sends the content to call attention to the trainee terminal.

Effects of the Invention

The VR education system of the present invention analyzes the gaze of the trainees to define the section of gaze concentration, and provides content to call attention in the section with low gaze concentration so that the trainee can actively concentrate on the lecture.

In addition, by comparing the preset teaching plan data with the instructor's actual lecture, the system calculates the matching rate and evaluates the instructor based on the calculated matching rate so that high-quality lectures faithful to the preset teaching plan can be provided.

Further, by using virtual reality to teach how to assemble, disassemble, and replace parts, the system can quickly provide education without waste or damage to new parts.

BRIEF DESCRIPTION OF DRAWINGS

FIG. 1 is a schematic diagram of the VR education system according to an embodiment of the present invention.

FIG. 2 is a block diagram of the VR education system according to an embodiment of the present invention.

FIG. 3 is a diagram to explain the instructor evaluation unit of the VR education system according to an embodiment of the present invention.

FIG. 4 is a diagram to explain the lecture providing unit of the VR education system according to an embodiment of the present invention.

FIG. 5 is a diagram to explain the lecture monitoring unit of the VR education system according to an embodiment of the present invention.

MODE FOR CARRYING OUT THE INVENTION

Specific matters for the present invention, such as the problems to be solved, means for solving the problems, and effects of the invention, are included in the following embodiments and drawings. Advantages and features of the present invention and how to achieve them will become apparent with reference to the embodiments to be described below in detail together with the accompanying drawings.

Hereinafter, the present invention will be described in more detail with reference to the accompanying drawings.

FIG. 1 is a schematic diagram of the VR education system according to an embodiment of the present invention, FIG. 2 is a block diagram of the VR education system according to an embodiment of the present invention, FIG. 3 is a diagram to explain the instructor evaluation unit of the VR education system according to an embodiment of the present invention, FIG. 4 is a diagram to explain the lecture providing unit of the VR education system according to an embodiment of the present invention, and FIG. 5 is a diagram to explain the lecture monitoring unit of the VR education system according to an embodiment of the present invention.

As seen in FIG. 1, the VR education system (100) may receive and collect data from the instructor terminal (200) and the trainee terminal (300), and provide output data corresponding to the input data.

More specifically, as seen in FIG. 2, the VR education system (100) may include a teaching plan storage unit (110), an instructor evaluation unit (120), an instructor recommendation unit (130), a lecture providing unit (140), and a lecture monitoring unit (150).

The teaching plan storage unit (110) may store the teaching plan for each lecture, including lecture information and at least one keyword and key image.

For example, if a teaching plan stored in the teaching plan storage unit (110) is related to part A, the developed view of the part A and images taken in different directions may be stored as key images, and words corresponding how to assemble and disassemble the part A may be included in the keywords.

The instructor evaluation unit (120) converts the instructor's voice data, input through the voice module of the instructor terminal (200), into text data by speech-to-text processing, and compares the converted data with the teaching plan data stored in the teaching plan storage unit (110) to calculate the matching rate.

The instructor recommendation unit (130) generates an instructor list in the order of matching rate, from highest to lowest, based on the matching rate calculated by the instructor evaluation unit (120), and provides it to the trainee terminal (300).

The lecture providing unit (140) may select one instructor from the instructor list from the trainee terminal (300) and provide the lecture of the selected instructor to the trainee terminal (300).

The lecture monitoring unit (150) monitors lectures in progress to detect any event that may occur during the lectures, and transmits a notification message to at least one of the instructor terminal (200) and the trainee terminal (300).

The said event refers to a situation in which a preset signal is not received from the instructor terminal (200) and the trainee terminal (300); for example, cases where input data such as voice data is not received for a preset time from the instructor terminal (200) or where gaze data is not input for a preset time from the trainee terminal (300).

In more detail, as described in FIG. 3, the instructor evaluation unit (120) processes the voice data input from the instructor terminal (200) and converts it into text data by speech-to-text (STT) processing, and calculates a matching rate by checking whether the key words and key images of the teaching plan data are included in the converted text data.

For example, when teaching plan data corresponding to a lecture topic set from the instructor terminal (200) is stored in the teaching plan storage unit (110), voice data input from the instructor terminal (200), "Please rotate and disassemble the part ○○○ counterclockwise," may be converted into text data. Thereafter, a matching rate may be calculated by comparing the converted text data with key words and key images stored in the teaching plan storage unit (110).

At this time, if the pronunciation or sound is unclear because the input voice data is converted into text data by speech-to-text processing, a notification requesting the input of the text data may be transmitted to the instructor terminal (200).

On the other hand, the matching rate may be determined in proportion to a score that has been assigned differentially based on a preset error range of the exposure time and the reference time, by comparing the exposure time in which the key words and key images are mentioned with the reference time allocated to the keywords and key images respectively included in the teaching plan data and calculating the exposure time after setting the initial start time of the lecture to 0.

For example, grade A, the highest score, is given if the exposure time is 5 seconds or less from the reference time, B grade, lower than the grade A, is given if the exposure time is more than 5 seconds and less than 20 seconds from the reference time, and grade C, the lowest score, may be given if the exposure time is more than 20 seconds and less than 60 seconds from the reference time.

In this case, the exposure time and the reference time may be compared when the key words and key images are mentioned in a preset order in the teaching plan data.

That is, the key words and key images of the teaching plan data are allocated based on a preset reference time and reference order. At this time, the reference order takes precedence over the reference time, and the reference time can be compared with the exposure time only when the reference order is met.

The instructor recommendation unit (130) calculates the overall score of the instructor by summing the matching rate calculated by the instructor evaluation unit (120), and may compare the overall scores of the instructors previously registered in the VR education system (100) to generate the instructor list in the order of overall score, from highest to lowest.

In this case, when there are two or more instructors having the same overall score, an instructor with more cumulative trainees who have selected a lecture provided by the instructor may be exposed first.

On the other hand, as shown in FIG. 4, the lecture providing unit (140) explains at least one method of assembling, disassembling, and replacing an object, which are the topics of the lecture, providing the mini-map (142) displaying the location of the object to the trainee terminal, and when the trainee reaches the location indicated on the mini-map (142), at least one animation (141) of assembling, disassembling, and replacing the object can be played.

The mini-map (142) may display a location where the object is located and at least one of locations where the object is to be assembled, disassembled, and replaced.

For example, the lecture providing unit (140) may provide instructor's video image (143) collected from the instructor terminal (200) to the trainee terminal (300).

As shown in FIG. 5, the lecture monitoring unit (150) collects image information to be input through the camera module in the trainee terminal (300) to analyzes the gaze of the trainee. When the gaze of the trainee is out of a preset frame, the lecture provided to the trainee terminal (300) is paused, and notification sound and text requesting concentration on the lecture are transmitted to the trainee terminal (300). The section where the trainee's gaze concentration is greater than or equal to a preset maximum level ($C_{max}$) is statistically processed and provided to the instructor terminal (200), and the section where the trainee's gaze concentration is lower than a preset minimum level ($C_{min}$) is statistically processed, with contents to call attention being automatically inserted into the trainee terminal (300).

More specifically, the gaze concentration refers to the average value of the gaze of all trainees participating in the lecture, and a signal message indicating that the gaze concentration is higher than the highest standard level ($C_{max}$) in the T1 section is sent to the instructor terminal (200), and a signal message indicating that the gaze concentration is less than the minimum standard level ($C_{min}$) in the T2 section is transmitted to the instructor terminal (200). The contents to call attention may be automatically played in the trainee terminal (300).

The contents to call attention may include mini-games, quizzes, and stretching inducing content for about 15 to 30 seconds.

For example, the teaching plan data may be updated on the basis of the statistically-processed gaze concentration.

According to the effect of the present invention as described above, the VR education system can make trainees actively concentrate on the lecture by analyzing the gaze of the trainees to define the gaze concentration sections and providing contents to call attention in the section of low gaze concentration.

In addition, the VR education system can calculate the matching rate by comparing the preset teaching plan data with the instructor's actual lecture, and evaluate the instructor based on the calculated matching rate so that high-quality lectures faithful to the preset teaching plan can be provided.

Further, by using virtual reality to teach how to assemble, disassemble, and replace parts, the VR education system can quickly provide education on new parts without wasting or breaking the parts.

In addition, the VR education method according to an embodiment of the present invention may be recorded in a computer-readable medium including program instructions to perform operations that can be implemented by various computers. The computer-readable medium may include program instructions, data files, data structures, or a combination thereof. The medium may be a program instruction specially designed and configured for the present invention, or may be known and usable by those skilled in computer software. The computer-readable recording media include hardware devices specially configured to store and execute program instructions, including magnetic media such as hard disks, floppy disks, and magnetic tapes, optical media such as CD-ROMs and DVDs, magnetic-optical media such as floptical disks, and ROM, RAM, and flash memory. The program instructions include not only machine language codes such as those produced by a compiler but also high-level language codes that can be executed by a computer using an interpreter or the like.

As described above, although the present invention has been described by the limited embodiments and the drawings, the present invention is not limited to the above-described embodiments, but various modifications and variations can be made to the present invention by those of ordinary skill in the field to which the present invention belongs. Accordingly, embodiments of the present invention should be understood only by the claims set forth below, and all equivalent modifications and variations thereof will be considered to be within the scope of the inventive concept.

DESCRIPTION OF SYMBOLS

110: Teaching plan storage unit
120: Instructor evaluation unit
130: Instructor recommendation unit
140: Lecture providing unit
150: Lecture monitoring unit

What is claimed is:
1. A VR (Virtual Reality) Education System, comprising:
one or more units being configured and executed by a processor using algorithm, the algorithm which when executed, causing the processor to perform the one or more units, the one or more units comprising:
a teaching plan storage unit configured to store a teaching plan data for each lecture, including lecture information and at least one of keywords and key images;
an instructor evaluation unit configured to convert an instructor's voice data, input through a voice module of an instructor's terminal, into text data by speech-to-text processing and compare the converted instructor's voice data with the teaching plan data stored in the teaching plan storage unit to calculate a matching rate;
an instructor recommendation unit configured to generate an instructor list in an order of the matching rate, from highest to lowest, based on the matching rate calculated by the instructor evaluation unit, and provide the instructor list to trainee terminals;

a lecture providing unit configured to provide a lecture of an instructor, selected from the instructor list from one of the trainee terminals, to another trainee terminal, and a lecture monitoring unit configured to monitor the lecture in progress to detect any event that occurs during the lecture and send a notification message to at least one of the instructor's terminal and the trainee's terminal, wherein the matching rate is determined in proportion to scores that are differentially assigned based on a preset error range between an exposure time calculated from a beginning of the lecture and a reference time by comparing the exposure time in which the keywords and key images are mentioned in the instructor's voice data with the reference time assigned to the keyword and key image in the teaching plan data, respectively, and determining whether the keywords and key images are mentioned in an order set in the teaching plan data to compare the exposure time and the reference time on condition that the keywords and key images are mentioned in a preset order, wherein the lecture monitoring unit is configured to collect image information to be input through a camera module in the trainee terminal, to analyze a gaze of a trainee, and when the gaze of the trainee is out of a preset frame, pause the lecture provided on the trainee terminal, sends an alert sound and text requesting concentration on the lecture, and sends an information of the trainee who received the alert sound and text to a lecturer, and statistically processes a section where a concentration degree is higher than a preset maximum level and provides it to the instructor terminal, and statistically processes the section where the concentration degree is less than a preset minimum level and automatically sends a content to call attention to the trainee terminal.

2. The VR Education System according to claim 1, wherein the instructor evaluation unit is configured to convert the instructor's voice data input from the instructor's terminal into the text data to calculate the matching rate by checking whether the key words and key images included in the teaching plan data are mentioned in the converted text data.

3. The VR Education System according to claim 2, wherein the lecture providing unit is configured to explain at least one method of assembling, disassembling, and replacing an object, which is a subject of the lecture, while providing a mini-map displaying a location of the object to the trainee terminal, and playing at least one animation of assembling, disassembling, and replacing the object in case a trainee reaches a position indicated on the mini-map.

4. The VR Education System according to claim 1, wherein the lecture providing unit is configured to explain at least one method of assembling, disassembling, and replacing an object, which is a subject of the lecture, while providing a mini-map displaying a location of the object to the trainee terminal, and playing at least one animation of assembling, disassembling, and replacing the object in case a trainee reaches a position indicated on the mini-map.

* * * * *